(12) United States Patent
Voronka et al.

(10) Patent No.: US 6,299,308 B1
(45) Date of Patent: Oct. 9, 2001

(54) LOW-COST NON-IMAGING EYE TRACKER SYSTEM FOR COMPUTER CONTROL

(75) Inventors: Nestor Voronka; Charles J. Jacobus, both of Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 0 days.

(21) Appl. No.: 09/540,314

(22) Filed: Mar. 31, 2000

Related U.S. Application Data

(60) Provisional application No. 60/127,511, filed on Apr. 2, 1999.

(51) Int. Cl.[7] ............................................. A61B 3/14
(52) U.S. Cl. ............................................. 351/210
(58) Field of Search .................... 351/208, 209, 351/210, 221; 702/150; 359/629, 630; 382/103, 291; 606/10, 11, 12

(56) References Cited

U.S. PATENT DOCUMENTS

| | | | |
|---|---|---|---|
| 4,102,564 | 7/1978 | Michael | 351/7 |
| 4,568,159 | 2/1986 | Baldwin | 351/210 |
| 4,735,498 | 4/1988 | Udden et al. | 351/210 |
| 4,958,925 | 9/1990 | Ober et al. | 351/210 |
| 5,231,674 | 7/1993 | Cleveland et al. | 382/6 |
| 5,345,281 | 9/1994 | Toboada et al. | 351/210 |
| 5,410,376 | 4/1995 | Cornsweet et al. | 351/210 |
| 5,481,622 | 1/1996 | Gerhardt et al. | 382/103 |
| 5,583,335 | 12/1996 | Spitzer et al. | 250/221 |
| 5,583,795 | * 12/1996 | Smyth | 702/150 |
| 5,610,673 | 3/1997 | Rafal et al. | 351/210 |
| 5,632,742 | * 5/1997 | Frey et al. | 606/12 |
| 5,638,176 | 6/1997 | Hobbs et al. | 356/335 |
| 6,079,829 | * 6/2000 | Bullwinkel | 351/210 |
| 6,149,272 | * 6/2000 | Bergner et al. | 351/221 |

* cited by examiner

Primary Examiner—George Manuel
(74) Attorney, Agent, or Firm—Gifford, Krass, Groh, Sprinkle, Anderson & Citkowski, PC

(57) ABSTRACT

A device for measuring eye movements is suitable for stand-alone, portable use and for integration into a head/helmet mounted display. The low-cost non-imaging eye tracking system is optimized toward the applications requiring computer cursor control by localizing the gaze direction as an operator looks through a fixed frame to provide pointing information to a computer.

7 Claims, 2 Drawing Sheets

LOW-COST NON-IMAGING EYE TRACKER SYSTEM FOR COMPUTER CONTROL

REFERENCE TO PRIOR APPLICATIONS

This application claims priority of U.S. provisional application Serial No. 60/127,511 filed Apr. 2, 1999, the entire contents of which are incorporated herein by reference.

FIELD OF THE INVENTION

This invention relates generally to human eye and head tracking and, in particular, to apparatus and methods wherein emitters and/or detectors are frame-mounted to achieve a more economical solution.

BACKGROUND OF THE INVENTION

The technique of measuring eye movements utilizing infrared light emitters and detectors placed in front of the eye is well known in the prior art. Typical arrangements of emitters and detectors include the use of imaging devices such as one- and two-dimensional charge coupled devices (CCD), and symmetrically arranged photodetectors such as photodiodes and phototransistors. The drawbacks of using CCD detectors primarily lie in cost as well as strict mechanical placement requirements, whereas the use of photodectors reduces cost and complexity of the device. The symmetrical arrangements specified in the prior art while simplifies the reduction of data, however may require the construction of devices that interfere with an operators eyebrow or nose.

The use of gaze location for computer cursor control is a key technology component that will enable users to interact with computer in a hands-free fashion. Cybernet Systems has successfully utilized video oculography eye tracking techniques to localize an operator's gaze for computer control. Drawbacks of this approach include the cost and complexity of the requisite components: video camera, frame grabber board, and dedicated personal computer to perform the image processing. Additionally, the placement of a video camera into the optical path of a head/helmet mounted display (HMD) presents significant integration challenge as well as increasing the size and weight of the head/helmet mounted components.

SUMMARY OF THE INVENTION

The present invention addresses many of the issues associated with video-based eye tracking by mounting infrared (IR) light emitting diodes (LEDs) and photodiode detectors on a frame disposed relative to one or both eyes being tracked. In this way, the eye tracking system can be small, lightweight, and inexpensive. The emitters and detectors may be oriented symmetrically, though by permitting the emitters and detectors to be arranged in a non-symmetrical fashion, packaging and integration problems are further minimized. This invention is an improvement over existing configurations by removing the constraint of orthogonal and symmetric placement of emitters and detectors. This improvement is significant in that it relaxes the placement requirements of these components making the overall mechanical design and integration tasks easier.

The signals from the sensors are differenced and digitized producing a signal that is highly correlated to the movement of the operator's eye. The relationship between eye movement and the detect signal is non-linear, however through the use of digital signal processing (DSP) techniques, the eye motion can be extracted.

DETAILED DESCRIPTION OF THE INVENTION

The eye is illuminated with one or more infrared light emitting diodes (IrLEDs) whose primary wavelength is in the 880–1100 nanometer range with an irradiance level well below prescribed eye safety limits. The IR illumination produces a reflection including a bright spot on the eye forming the first Purkinje image based on the specular corneal reflection of the eye and reflecting light from the retina. As the eye moves, the first Purkinje image (also known as the glint) also moves due to the difference between the curvature of the eyeball and the corneal bulge, and it is the location of the glint that is the primary signal of interest.

Using photodetectors such as IR sensitive photodiodes or phototransistors, the total integrated irradiance over the field of view of the detector can be measured. By placing pairs of photodetectors on opposite sides of a frame relative to the eye, the location of the glint along the axis between the two detectors can be estimated. The difference is an estimate and not a measurement because the photodectors produce a current that is proportional to the number of photons incident in their field of view. Therefore, total irradiance as modulated by the optical beam pattern is measured by the detectors. Due to the relative brightness of the glint in comparison to the image of the cornea and sclera of the eye, the signal (glint) to noise (image) ratio is such that the position of the glint dominates the signal.

To make a motion measurement in the horizontal dimension, a pair of photodetectors must be placed along the desired axis of measurement. The illumination photoemitter or photoemitters should be placed along the perpendicular bisector of the measurement axis. In certain configurations the upper photoemitter does not contribute to the signal to noise ratio and occasionally reduces it and is summarily omitted. To make a measurement in the orthogonal direction, prior art reveals the placement of symmetrical photodetectors along the orthogonal axis with emitters along perpendicular bisector of that detector axis.

Figure 1:
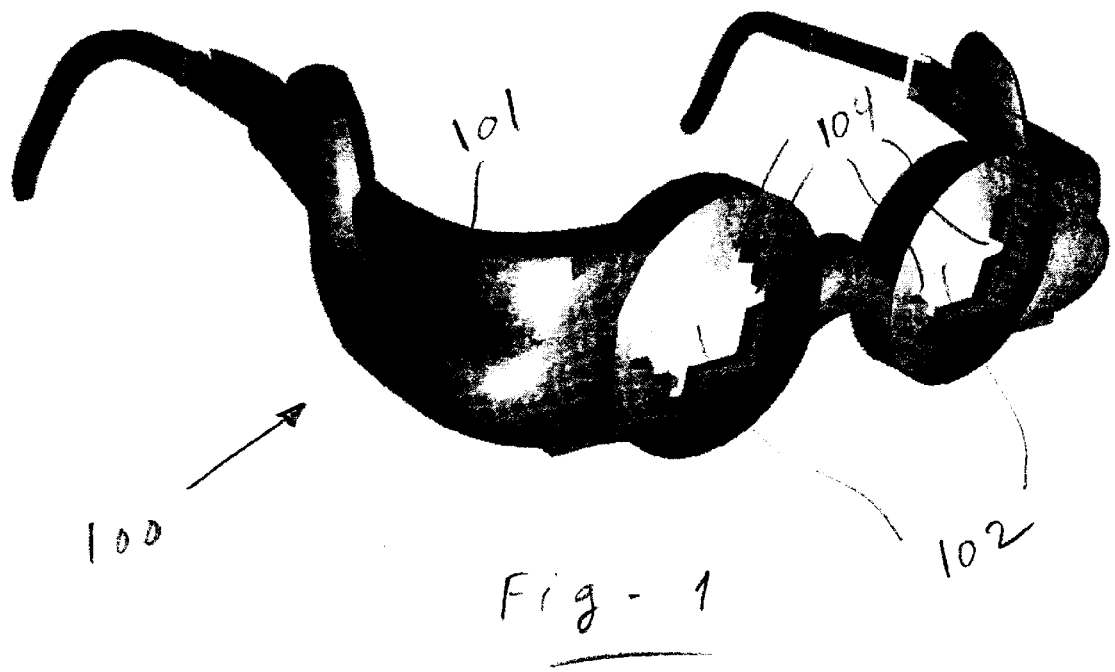
FIG. 1 is a perspective-view rendering of an eye tracker system according to the invention utilizing eyeglass frames.
Figure 2:
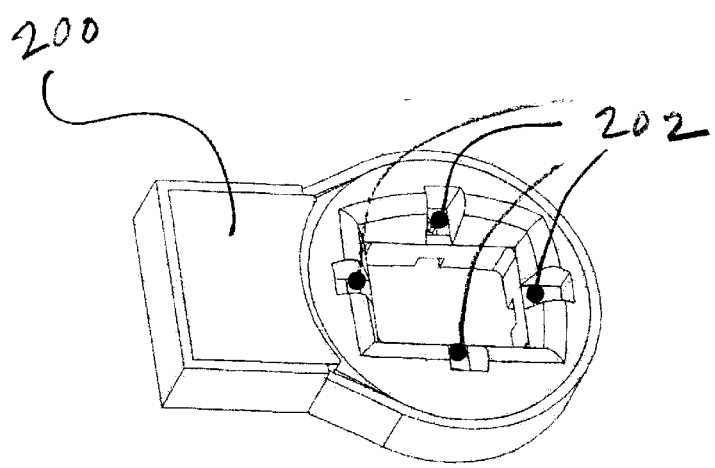
FIG. 2 is a perspective-view drawing of an eye tracker system forming part of a monocle.

FIG. 1 is a perspective-view rendering of an eye tracker system according to the invention generally at 100, which utilizes a pair of eyeglass frames 101 having transparent or see-through apertures 102. The detectors and emitters are positioned in spaces 104, which are better visualized in FIG. 2, which is a perspective-view drawing of an eye tracker system forming part of a monocle 200. Although FIG. 2 shows the emitters and detectors placed in orthogonal locations 202, the invention does not require the placement of orthogonal pairs of detectors. To estimate measurements in the orthogonal axis using an off-axis detector configuration, vector subtraction is used to remove the undesired component from the first axis. Even though the detector pairs are not orthogonal to each other, their position must be precisely alight to allow for accurate measurements. This is accomplished by placing the emitters, detectors and photocurrent preamplifiers onto a printed circuit board (PCB) with a viewing aperture for the user.

Figure 3:
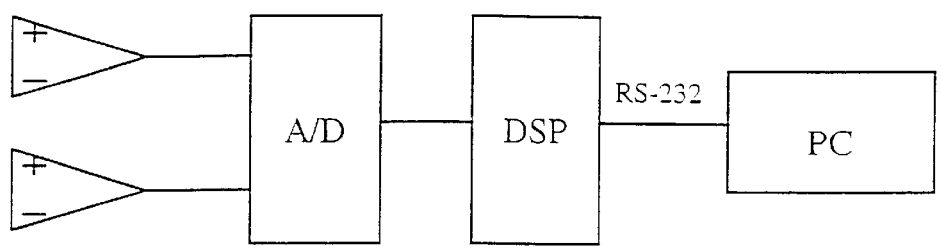
FIG. 3 is an illustration of an eye tracker implementation with A/D and DSP.

The photocurrents are amplified using transimpedance amplifiers and differenced by an instrumentation amplifier as is commonly practiced. The resultant differenced signal's offset has a significant variation over the sampled population and the devices resolution and range is improved by removing this offset. As shown in the block diagram of FIG. 3, this can readily be accomplished with an digital to analog converter (DAC) and a summing amplifier or an analog sample and hold amplifier whose droop has been minimized. This difference signal is fed into an analog to digital converter (ADC) for digitization and input into a microcontroller or digital signal processor (DSP.) The digital signal processor is then connected to a computer via a RS-232 serial or Universal Serial Bus (USB) port.

Appropriate software is resident on the embedded processor to perform all of the requisite calculations for direct horizontal and vertical motion output or to emulate a mouse. Since the transfer function that relates the measured signals to gaze location is highly non-linear and subject to calibration, the device operates under DSP control to maximize the system's performance. In the current implementation there is a DSP that flashes the LEDs, and samples the intensity of the differenced signals with an AID at a rate of 600 Hz. The DSP averages the data to increase the SNR as well as minimize the effects of ambient indoor lighting which is modulated at the rates of 60 Hz and 120 Hz and their harmonics. The DSP therefore samples the data, averages the raw samples, processes it through a non-linear transfer function determined during calibration, and then sends an appropriate positional mouse command to the computer through the serial port. The transfer function ranges from a $3^{rd}$ to $5^{th}$ order polynomial in both X and Y depending on the complexity of the calibration performed.

Figure 4:
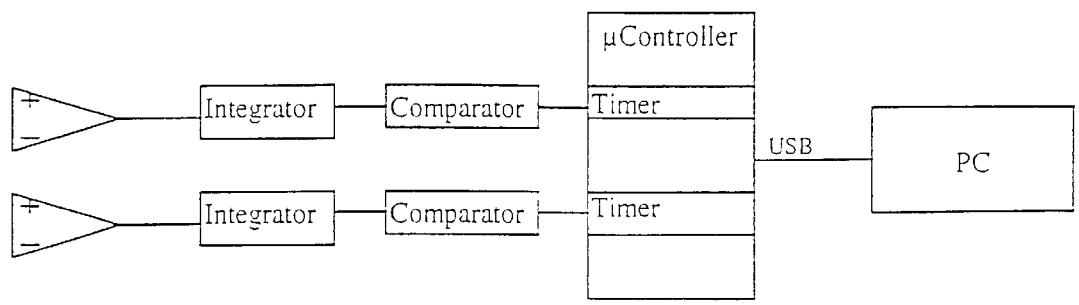
FIG. 4 is an illustration of an eye tracker utilizing integrators and comparators.

Another implementation of this eye tracker that would reduce the cost of the system even further is one in which the A/D converter and DSP are removed. As shown in the block diagram of FIG. 4, in place of the DSP, an inexpensive microcontroller with special circuitry to capture timer values and communicate via USB used. Light measurement is achieved by feeding the output of the differencing amplifiers into an integrating circuit, and comparing that signal with an appropriate threshold. The output of the thresholding comparator is used to capture the value of a digital timer which can produce a highly accurate, already averaged value of horizontal and vertical position. The non-linear transfer function can then be applied either in the microcontroller or in the device driver on the personal computer being used.

The head tracker that is used to track the location of the head with respect to the LCD or CRT operates on similar principles. There is a cluster of IR LEDs that is located on top of the CRT or LCD and another set of horizontal and vertical detector pairs is used to track their location. The position and orientation of the head can be measured by illuminating individual LEDs and tracking their position separately. This technique will work both for the A/D and integrator/thresholding configurations.

The calibration that is typically performed with this device requires that the user fixates his gaze upon a given point on the screen while data samples are taken from the sensors. The procedure typically has the user fixate on a white point depicted on a black background to determine the bias of the outputs. Then the user fixates on a nunber of points displayed in a grid on the screen one at a time. These raw measurements are then fed into a regression routine to calculate coefficients for the polynomial transfer functions and then used for subsequent measurement outputs. In addition to the transfer function's coefficients, the regression routine returns a metric indicating how well the measurements fit the grid after regression. This is a fairly good indicator as to the accuracy of the system, however a good calibration metric does not always guarantee a good calibration.

Another embodiment of this eye tracker does not require any calibration. This embodiment utilizes sliding or rotating controls that the user operates to control the offset, range and skew of the transfer functions to intuitively get the best calibration. These controls can either be mechanical and integrated into the actual device, or could also be software sliders or knobs that adjust transfer function coefficients.

We claim:

1. An eye tracking system, comprising:
   a transparent aperture;
   at least one infrared light-emitting diode (LED) mounted on the aperture, the LED being positioned to illuminate an exposed eye surface of a user so as to produce a Purkinje reflection;
   at least one photodetector mounted on the aperture to detect the Purkinje reflection; and
   electronics for processing the signal from the photodetector to determine eye movement in two dimensions.

2. The system of claim 1, wherein the photodetector is an infrared sensitive photodiode.

3. The system of claim 1, wherein the transparent aperture is mounted on a frame, the system further including one or more pairs of photodetectors disposed along a measurement axis on opposite sides of the frame.

4. The system of claim 3, wherein the LED is disposed along the perpendicular bisector of the measurement axis.

5. The system of claim 1, wherein the electronics for processing the signal is interfaced to a display screen, and the determination of the eye movement is used to control a pointing device on the display screen.

6. The system of claim 1, further including a head tracker for determining the location of the user's head.

7. The system of claim 6, wherein the head tracker includes a plurality of photoemitters and photodetectors mounted relative to a display screen.

* * * * *

UNITED STATES PATENT AND TRADEMARK OFFICE
CERTIFICATE OF CORRECTION

PATENT NO. : 6,299,308 B1
DATED : October 9, 2001
INVENTOR(S) : Nestor Voronka and Charles J. Jacobus It is certified that error appears in the above-identified patent and that said Letters Patent is hereby corrected as shown below:

Column 1,
Line 1, insert the following paragraph,
-- This invention was made with Government support under contract DAAL01-98-C-0057 (awarded by the U.S. Army). The Government has certain rights in this invention. --

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,299,308 B1  
APPLICATION NO. : 09/540314  
DATED : October 9, 2001  
INVENTOR(S) : Voronka et al.

Page 1 of 1

It is certified that error appears in the above-identified patent and that said Letters Patent is hereby corrected as shown below:

Column 1, line 8, insert:

--GOVERNMENT SUPPORT

This invention was made with Government support under Contract No. DAAL01-98-C-0057 awarded by the United States Army. The Government has certain rights in the invention.--

Signed and Sealed this

Seventeenth Day of November, 2009

David J. Kappos  
*Director of the United States Patent and Trademark Office*